(12) United States Patent
Schaeffer et al.

(10) Patent No.: US 7,533,795 B2
(45) Date of Patent: May 19, 2009

(54) WELDING PROCESS

(75) Inventors: Jon Conrad Schaeffer, Greenville, SC (US); Ariel Caesar-Prepena Jacala, Simpsonville, SC (US); Doyle C. Lewis, Greer, SC (US); Thaddeus Jan Strusinski, Easley, SC (US); Frederick Whitfield Dantzler, Jr., Simpsonville, SC (US); Eugene Franklin Clemens, Brownsburg, IN (US); Paul Stuart Wilson, New Richmond, OH (US); Micahel Butler, Houston, TX (US); Jeffrey Aaron Killough, Houston, TX (US)

(73) Assignee: General Electric Company, Schenectady, NY (US)

( * ) Notice: Subject to any disclaimer, the term of this patent is extended or adjusted under 35 U.S.C. 154(b) by 602 days.

(21) Appl. No.: 10/905,255

(22) Filed: Dec. 22, 2004

(65) Prior Publication Data

US 2006/0131366 A1    Jun. 22, 2006

(51) Int. Cl.
*B23K 31/02* (2006.01)
(52) U.S. Cl. ............. 228/226; 228/119; 228/248.5; 228/262.3; 148/527; 29/889.1
(58) Field of Classification Search .......... 148/404, 148/524, 525; 219/121.64, 76.1, 121.63, 219/121.85, 121.8, 137 R, 137 WM; 228/231, 228/232, 262.3, 233.2, 226, 119
See application file for complete search history.

(56) References Cited

U.S. PATENT DOCUMENTS

| | | | |
|---|---|---|---|
| 5,319,179 A | 6/1994 | Joecks et al. ............ 219/137 R |
| 5,374,319 A | 12/1994 | Stueber et al. ............ 148/404 |
| 5,806,751 A * | 9/1998 | Schaefer et al. ............ 228/119 |
| 5,897,801 A | 4/1999 | Smashey et al. ..... 219/137 WM |
| 5,951,792 A * | 9/1999 | Balbach et al. ............ 148/527 |
| 6,454,156 B1 * | 9/2002 | Taras et al. ................. 228/165 |
| 6,742,698 B2 * | 6/2004 | Shah et al. .................. 228/119 |
| 2005/0120941 A1 * | 6/2005 | Hu et al. ....................... 117/1 |

OTHER PUBLICATIONS

Gandy et al., EPRI Technical Report, 2000, Palo Alto, CA- p. 20. http://www.eprictcenter.com/infocenter/ct_o_and_m/pdf/asmpaper102000.pdf.*

* cited by examiner

*Primary Examiner*—Kiley Stoner
*Assistant Examiner*—Devang Patel
(74) *Attorney, Agent, or Firm*—Hartman & Hartman, P.C.; Gary M. Hartman; Domenica N.S. Hartman

(57) ABSTRACT

A weld process cuitable for repairing precipitation-strengthened superalloys, and particularly gamma prime-strengthened nickel-based superalloys. The process entails forming a weldment in a cavity present in a surface of an article formed of a precipitation-strengthened superalloy. The cavity has a root region and a cap region between the root region and the surface of the article. A solid body formed of a superalloy composition is placed in the root region of the cavity so as to occupy a first portion but not a second portion of the root region. A first filler material formed of a solid solution-strengthened superalloy is then weld-deposited in the second portion of the root region. Subsequently, a second filler material formed of a precipitation-strengthened superalloy is weld-deposited in the cap region of the cavity.

18 Claims, 2 Drawing Sheets

WELDING PROCESS

BACKGROUND OF THE INVENTION

The present invention generally relates to welding processes and materials. More particularly, this invention relates to a process for welding precipitation-strengthened superalloys that are prone to cracking when welded.

Superalloys are used in the manufacture of components that must operate at high temperatures, such as buckets, nozzles, combustors, and transition pieces of industrial gas turbines. During the operation of such components under strenuous high temperature conditions, various types of damage or deterioration can occur, including wear and cracks. Because the cost of components formed from superalloys is relatively high, it is more desirable to repair these components than to replace them. For the same reason, new-make components that require repair due to manufacturing flaws are also preferably repaired instead of being scrapped.

Methods for repairing nickel-base superalloys have included gas tungsten arc welding (GTAW) techniques. GTAW is known as a high heat input process that can produce a heat-affected zone (HAZ) in the base metal surrounding the weldment. A filler is typically used in GTAW repairs, with the choice of filler material being between a ductile filler or a filler whose chemistry closely matches that of the base metal. An advantage of using a ductile filler is a reduced tendency for cracking in the weldment. On the other hand, a significant advantage of using a filler whose chemistry closely matches the base metal is the ability to more nearly maintain within the component the desired properties of the superalloy base material.

Directionally-solidified (DS) and single-crystal (SX) castings formed of precipitation-strengthened nickel-base superalloys have proven to be particularly difficult to weld. Though an equiaxed (EA) precipitation-strengthened nickel-based superalloy filler wire having a composition similar to that of the superalloy base material being welded would provide an optimum weld repair, the result is often solidification shrinkage, hot tears, and cracking during and after the welding processes, and strain age cracking due to gamma prime ($\gamma'$) precipitation (principally $Ni_3(Al,Ti)$) during post-weld vacuum heat treatment. Cracking is particularly likely in the termination region of the weldment. Further complicating the termination of the weldment is the typical geometry of the superalloy article being welded.

In view of the above, improved methods are required for welding precipitation-strengthened superalloys that will yield crack-free weldments.

BRIEF SUMMARY OF THE INVENTION

The present invention provides a weld process suitable for repairing precipitation-strengthened superalloys, and particularly gamma prime-strengthened nickel-based superalloys. The process of this invention minimizes solidification shrinkage, the incidence of hot tears and cracking during and after the welding processes, and the incidence of strain age cracking during post-weld heat treatment.

The process generally entails forming a weldment in a cavity present in a surface of an article formed of a precipitation-strengthened superalloy. The cavity has a root region and a cap region between the root region and the surface of the article. A body formed of a superalloy composition is placed in the root region of the cavity to occupy a first portion but not a second portion of the root region. The superalloy composition of the body may be a precipitation-strengthened superalloy or a solid solution-strengthened superalloy, and may be more ductile than the precipitation-strengthened superalloy of the article. A first filler material formed of a solid solution-strengthened superalloy is then weld-deposited in the second portion of the root region. Subsequently, a second filler material formed of a precipitation-strengthened superalloy is weld-deposited in the cap region of the cavity.

In view of the above, the process of this invention yields a weldment in which the cap region of the weldment is formed by an equiaxed, precipitation-strengthened superalloy whose chemistry can be approximately the same as the precipitation-strengthened superalloy forming the base metal of the article, while the root region of the weldment is formed to contain at least one solid solution-strengthened superalloy whose chemistry differs from those of the precipitation-strengthened superalloys to provide different properties, most notably, greater ductility. The combination of a high-strength solid body in the root region of the weldment, a filler formed of a ductile solution-strengthened superalloy in the root region of the weldment, and a precipitation-strengthened superalloy in the cap region of the weldment is believed to enable the process of this invention to yield crack-free repairs, including the weldment termination region, as a result of reducing solidification shrinkage, hot tears, and strain age cracking that are inherent with precipitations-strengthened superalloys, such as gamma prime-strengthened nickel-based alloys. In view of this benefit, the weld process of this invention is capable of promoting full life capability to a weldment. The welding technique of this invention is particularly beneficial in regions of an article where root pass drop-through is a concern, such as where the weldment has a wide, long, and deep geometry.

Other objects and advantages of this invention will be better appreciated from the following detailed description.

DETAILED DESCRIPTION OF THE INVENTION

Figure 1:
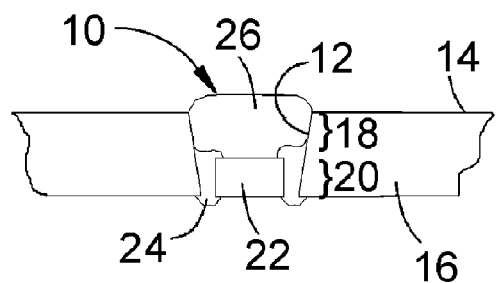
FIG. 1 schematically represents a lateral cross-sectional view of a weldment formed by performing a welding process in accordance with the present invention.

FIG. 1 schematically represents a weldment 10 formed in a component 16 by a welding process that enables the weldment 10 to exhibit enhanced robustness. The invention will be described in reference to the component 16 being a single-crystal casting formed of a gamma prime-strengthened (principally $Ni_3(Al,Ti)$) nickel-based superalloy (hereinafter, gamma-prime nickel superalloy), as is often the case for nozzles (vanes), buckets (blades), and other components located within the combustors and turbine sections of industrial and aircraft gas turbines. Particularly notable examples of gamma-prime nickel superalloys include René 125, René 80, René N5, René N4, René 108, GTD-111™, GTD-444™, IN738, IN792, MAR-M200, MAR-M247, CMSX-3, CMSX-4, PWA1480, PWA1483, and PWA1484, each of which has a relatively high gamma prime content as a result of the significant amounts of aluminum and/or titanium they contain. However, it is foreseeable that the advantages of this invention could be obtained with components formed by other methods from a variety of materials that are prone to cracking or tearing during manufacture or repair by welding.

The weldment 10 is represented as being formed within a cavity 12 in a surface 14 of the component 16, and particularly through a wall section of the component 16. The weldment 10 includes a cap 18 that is adjacent the surface 14 of the component 16 and completely covers a root 20 of the weldment 10 beneath the cap 18. Suitable relative volumes for the cap 18 and root 20 will depend on thermal expansion stresses induced during processing. Typically, the cap 18 may constitute about 10 to about 50%, more preferably about 15 to about 30%, of the total depth of the weldment 10. The root 20 has a central portion 22 and a filler portion 24 that surrounds the central portion 22. The central portion 22 may contain a precipitation-strengthened or solid solution-strengthened superalloy, while the filler portion 24 is formed of a solid solution-strengthened superalloy. As such, the superalloys of the central and filler portions 22 and 24 may be the same or different. Generally, the alloys should share similar physical and mechanical properties, though a stronger alloy for the central portion 22 is believed to be preferable if the cavity 12 is relatively large. For use with a single-crystal gamma-prime nickel superalloy, the central portion 22 may be formed of the same or similar gamma-prime nickel superalloy, or a solid solution-strengthened nickel-based superalloy containing sufficient nickel, chromium, cobalt, and molybdenum to yield a desirable combination of metallurgical stability, strength, and oxidation resistance at high temperatures, the latter of which can be enhanced by additions of aluminum. The filler portion 24 also benefits from solid solution-strengthened nickel-based superalloys of the type noted for the central portion 22. Particularly notable solid solution-strengthened nickel-based superalloys that exhibit suitable ductility for use as the central and filler portions 22 and 24 of the weldment 10 include IN600, IN617, IN625, Nimonic 263, and Haynes 230. These alloys contain very little if any gamma prime phase (and therefore are not susceptible to strain age cracking), and exhibit high ductility at temperatures sustained during the processing of this invention as well as processing and service temperature ranges typical for nozzles (vanes), buckets (blades), and other components located within the combustors and turbine sections of industrial and aircraft gas turbines.

In contrast to the root 20, the cap 18 is preferably formed entirely by an equiaxed precipitation-strengthened superalloy filler 26. If the base metal of the component 16 is formed of a single-crystal gamma-prime nickel superalloy, the cap filler 26 is more preferably a gamma-prime nickel superalloy whose chemistry is the same or similar to that of the superalloy base metal of the component 16. For example, a suitable superalloy for the cap filler 26 may primarily differ from the superalloy base metal of the component 16 by containing grain boundary strengtheners, constituents that promote oxidation resistance, etc. At minimum, the precipitation-strengthened superalloys of the component 16 and cap 18 preferably share similar physical and mechanical properties, such as creep strength, fatigue strength, oxidation resistance, etc. Particularly notable gamma-prime nickel superalloys suitable for forming the cap 18 include René 125, René 80, René 142, René 195, René 108, GTD-111™, GTD-741™IN738, and MAR-M200. These alloys exhibit high creep strength as a result of containing large volume fractions of the gamma-prime strengthening phase, as well as generally being alloyed to exhibit a balance of strength and environmental resistance. As such, these alloys are also suitable for forming the central portion 22 if the weldment 10 in those applications where a precipitation-strengthened superalloy is preferred for the central portion 22 as discussed above.

Figure 2:
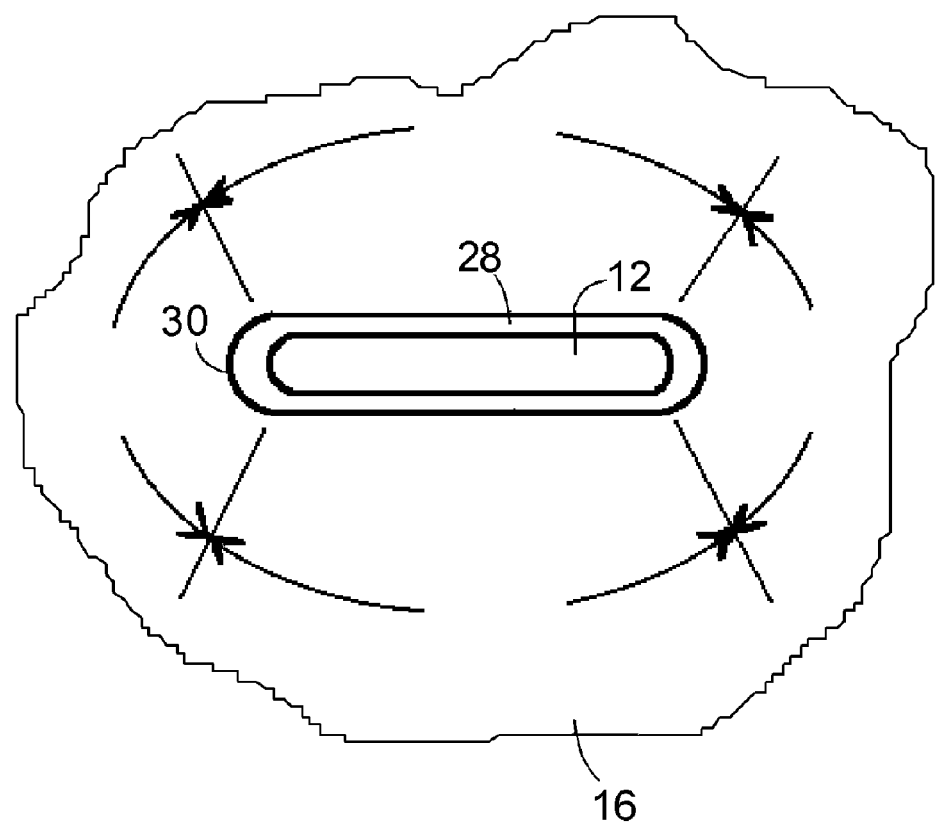
FIG. 2 represents a plan view of a surface cavity prepared for receiving the weldment of FIG. 1.
Figure 3:
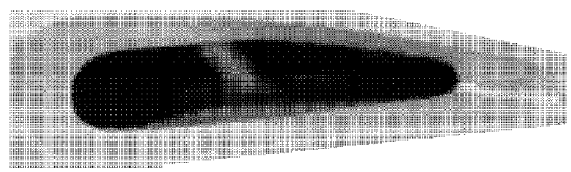
FIGS. 3 through 7 are scanned images illustrating steps performed in the welding process of this invention.

The weldment 10 of FIG. 1 is produced by a welding process that is particularly effective as a welding closure process for wide, long and deep weldment geometries where root pass drop through is critical, such as the above-noted gas turbine components. FIGS. 2 and 3 are a schematic representation and scanned image, respectively, of a suitable geometry for the cavity 12 after being machined in preparation for the weldment 10 and welding operation. The walls 28 and 30 of the cavity 12, which make up the perimeter of the cavity 12 as indicated by the arrows in FIG. 2, are preferably configured to optimize the mechanical properties of the weldment 12. In FIG. 2, the lateral side walls 28 of the cavity 12 are preferably inclined at an angle of about 15 to 30 degrees from the normal axis of the cavity 12 (i.e., about 60 to 75 degrees from the surface 14 of the component 16), while the longitudinal end walls 30 are preferably inclined at an angle of about 40 to 55 degrees from the normal axis of the cavity 12 (i.e., about 35 to 50 degrees from the surface 14 of the component 16).

According to the present invention, the central portion 22 of the weldment 10 is formed by a solid body placed in the cavity 12 and metallurgically bonded to the walls 28 and 30 of the cavity 12 with the filler portion 24 of the weldment root 20. The solid body is preferably centrally located within the cavity 12 and has a shape approximately congruent to the shape of the cavity 12, thereby defining a generally uniform but limited gap that surrounds the solid body. The gap may have a width of up to about 20 mils (about 0.5 mm), more preferably about 0 to about 10 mils (about 0 to 250 mm). Tack welds, such as of the type that can be formed by a manual GTAW technique, may be used to hold the solid body in place until the filler portion 24 is deposited. The tack welds need only be of sufficient size and number to secure the solid body to the component 16 during deposition of the filler portion 24. The materials for the filler portion 24 and cap filler 26 can then be deposited within the cavity 12, preferably using GTAW welding processes. In particular, the filler portion 24 is deposited to fill the gap surrounding the solid body and metallurgically bond the solid body to the walls 28 and 30 of the cavity 12, after which the weldment 10 is completed with a cap pass weld that deposits the cap filler 26 over the central and filler portions 22 and 24. After the welding operations, the component 16 preferably undergoes a vacuum heat treatment, as conventionally practiced when welding superalloys. Though not shown as such in FIG. 1, the cap filler 26 can be machined so that its outer surface is substantially coplanar with the surrounding surface 14 of the component 16.

FIGS. 3 through 7 are scanned images of a surface cavity in a directionally-solidified gas turbine component that was cast from the GTD-111™ superalloy and underwent the weld process of this invention. The casting had a nominal composition of, in weight percent, Ni-14Cr-9.5Co-3Al-5Ti-1.6Mo-3.8W-2.8Ta-0.01C. The cavity seen in FIG. 3 was machined in a region of the casting having a wall thickness of about 0.20 inch (about 5 mm) mm. The cavity extended completely through the casting wall and had nominal dimensions of about 0.5×2.5 inches (about 13×64 mm) at the surface of the casting. The side walls and end walls of the cavity were inclined at angles of about 25 and 45 degrees, respectively, from the normal axis of the cavity.

Figure 4:
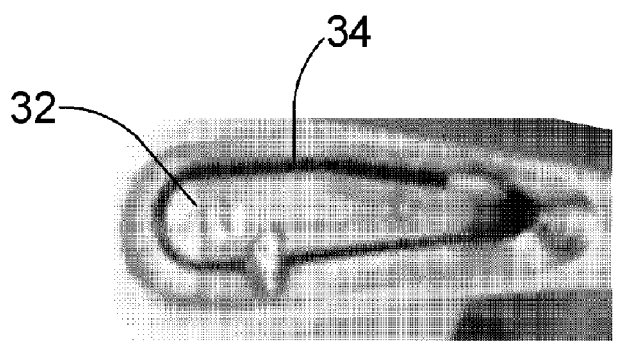

FIG. 4 is a scanned image showing the appearance of the cavity of FIG. 3 following placement of a plate 32 within the cavity prior to the welding operation (the term "plate" as used herein is a matter of convenience, and is not intended to suggest a particular shape). The plate 32 can be seen as centrally located within the cavity and to have a shape approximately congruent to the shape of the cavity, thereby defining a generally uniform gap 34 that surrounds the plate 32. The plate 32 is shown as being tack-welded in place using a manual GTAW technique in preparation for the welding operation. As evident from the above discussion, the plate 32 will form the central portion 22 of the weldment root 20 (FIG. 1). For the investigation, the plate 32 was formed of GTD-111™, having the same nominal composition as that of the casting. A gamma-prime alloy was selected for the plate 32 on the basis of the relatively large size of the cavity being repaired, and the GTD-111™ alloy was particularly chosen for its excellent creep strength and environmental resistance. The plate 32 was cast and machined to provide a close fit with the cavity.

Figure 5:
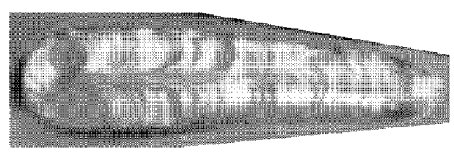

FIG. 5 is a scanned image showing the result of performing a root pass weld operation to fill the gap 34 surrounding the plate 32 with a solid solution-strengthened superalloy filler. A GTAW welding process was used to deposit the root filler which, in the specimen shown in FIG. 5, was formed of IN617 having a nominal composition of, in weight percent, Ni-22Cr-12Co-1Al-0.3Ti-9Mo. As a result of the welding operation, the surface of the plate 32 and the walls of the cavity were partially melted to form strong metallurgical bonds with the root filler.

Figure 6:
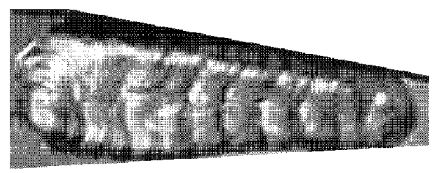
Figure 7:
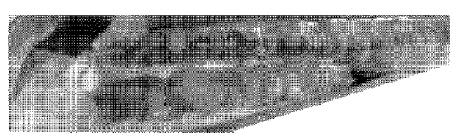

FIG. 6 is a scanned image showing the appearance of a weldment produced by completing a cap pass over the root pass weld of FIG. 5. The cap filler was deposited using a GTAW welding process performed at a temperature above 1500° F. (above 815° C.). The cap filler was also formed of GTD-111™ with the same nominal composition as that for the casting and plate 32. FIG. 7 is an opposing view of the weldment of FIG. 6, and shows the root pass weld as it appears following a post-weld vacuum heat treatment that was conducted at about 1975° F. (about 1080° C.) for about two hours. At the completion of the heat treatment, no solidification shrinkage, hot tears, or strain age cracking was observed during fluorescent penetrant inspection (FPI) and metallographic examination of the specimen.

The results of the above investigation evidenced that relatively wide, long, and deep cavities in a gamma prime superalloy can be repaired with a robust weldment formed by a plate having essentially the same properties as the base metal, a ductile filler securing the plate within the root of the cavity, and a capping filler having the same chemistry as that of the base metal. As such, the weld procedure was concluded to be suited for producing robust weldments in the manufacturing and repairing of a variety of precipitation-strengthened components, notable examples of which are single-crystal nozzle and bucket castings for industrial gas turbines and aircraft gas turbine engines, whose thin wall sections increase the likelihood of root pass drop through. While the plate 32 used in the investigation was formed of a gamma prime superalloy, robust weldments can be produced using a plate 32 (or other suitable solid body) formed of a solid solution-strengthened superalloy and/or a superalloy significantly more ductile than the base metal being repaired, particularly when repairing cracks and other small cavities smaller than that repaired in the investigation.

While the invention has been described in terms of a preferred embodiment, it is apparent that other forms could be adopted by one skilled in the art. Therefore, the scope of the invention is to be limited only by the following claims.

What is claimed is:

1. A process of forming a weldment in a cavity present in a surface of an article formed of a first precipitation-strengthened superalloy, the cavity having a root region and a cap region between the root region and the surface of the article, the process comprising the steps of:

placing a solid body in only the root region of the cavity, the solid body being sized to occupy a central portion but not a peripheral portion between the central portion and side walls of the root region of the cavity, the solid body being formed of a superalloy composition;

depositing by welding a first filler material in the peripheral portion of the root region such that in combination the solid body and the first filler material completely fill the root region but are not present in the cap region, the first filler material being formed of a solid solution-strengthened superalloy;

depositing by welding a second filler material in the cap region of the cavity to form a weldment that fills the cavity and comprises the solid body and the first and second filler materials, the second filler material being formed of a second precipitation-strengthened superalloy; and then heat treating the weldment, wherein the heat-treated weldment contains the solid body and the first filler material which in combination completely fill the root region of the cavity and contains the second filler material in the cap region of the cavity.

2. The process according to claim 1, wherein the first and second precipitation-strengthened superalloys, the superalloy composition of the solid body, and the solid solution-strengthened superalloy of the first filler material are nickel-based superalloys.

3. The process according to claim 1, wherein at least one of the superalloy composition and the solid solution-strengthened superalloy is more ductile than the first and second precipitation-strengthened superalloys.

4. The process according to claim 1, wherein the superalloy composition of the solid body and the solid solution-strengthened superalloy of the first filler material are more ductile than the first and second precipitation-strengthened superalloys.

5. The process according to claim 1, wherein the superalloy composition of the solid body is a solid solution-strengthened superalloy.

6. The process according to claim 1, wherein the superalloy composition of the solid body is a precipitation-strengthened superalloy.

7. The process according to claim 1, wherein the cavity extends through the article so as to define an opening on a second surface of the article.

8. The process according to claim 1, wherein the first portion of the cavity occupied by the solid body is a central portion of the root region of the cavity, and the second portion of the root region of the cavity is a peripheral portion of the root region.

9. The process according to claim 1, wherein prior to the placing step the cavity is machined to define a laterally-opposed pair of side walls and a longitudinally-opposed pair of end walls, each of the side walls and end walls being inclined relative to a normal direction to the surface of the article.

10. The process according to claim 9, wherein the side walls are inclined relative to the normal direction at angles that are less than angles at which the end walls are inclined relative to the normal direction.

11. The process according to claim 1, wherein the second filler material completely covers the first filler material and the solid body at the surface of the article.

12. The process according to claim 1, wherein the article is a single-crystal casting of the first precipitation-strengthened superalloy.

13. A process of forming a weldment in a cavity present in a surface of a single-crystal casting formed of a first precipitation-strengthened nickel-based superalloy, the cavity having a root region and a cap region between the root region and the surface of the casting, the process comprising the steps of:

securing a solid body in the root region of the cavity, the solid body being sized to fill a central portion but not a peripheral portion between the central portion and side walls of the root region of the cavity, the solid body being formed of a superalloy composition;

welding a first filler material in the peripheral portion of the root region such that in combination the solid body and the first filler material completely fill the root region but are not present in the cap region, the first filler material being formed of a solid solution-strengthened nickel-based superalloy;

welding a second filler material in the cap region of the cavity so as to cover the solid body and the first filler material and form a weldment that completely fills the cavity and comprises the solid body and the first and second filler materials, the second filler material being formed of a second precipitation-strengthened nickel-based superalloy; and then heat treating the weldment, wherein the heat-treated weldment contains the solid body and the first filler material which in combination completely fill the root region of the cavity and contains the second filler material in the cap region of the cavity.

14. The process according to claim 13, wherein at least one of the superalloy composition of the solid body and the solid solution-strengthened nickel-based superalloy of the first filler material is more ductile than the first and second precipitation-strengthened nickel-based superalloys.

15. The process according to claim 13, wherein the superalloy composition of the solid body is a solid solution-strengthened superalloy, and the solid solution-strengthened nickel-based superalloys of the solid body and the first filler material are more ductile than the first and second precipitation-strengthened nickel-based superalloys.

16. The process according to claim 13, wherein the superalloy composition of the solid body is a precipitation-strengthened superalloy.

17. The process according to claim 13, wherein the cavity extends through the casting so as to define an opening on a second surface of the casting.

18. The process according to claim 13, wherein prior to the placing step the cavity is machined to have an oblong shape and define a laterally-opposed pair of side walls and a longitudinally-opposed pair of end walls, each of the side walls and end walls being inclined relative to a normal direction to the surface of the article, the side walls being inclined relative to the normal direction at angles that are less than angles at which the end walls are inclined relative to the normal direction.

\* \* \* \* \*

UNITED STATES PATENT AND TRADEMARK OFFICE
CERTIFICATE OF CORRECTION

PATENT NO. : 7,533,795 B2 Page 1 of 1
APPLICATION NO. : 10/905255
DATED : May 19, 2009
INVENTOR(S) : Jon Conrad Schaeffer et al.

It is certified that error appears in the above-identified patent and that said Letters Patent is hereby corrected as shown below:

On the Title pg.
Item (75) Inventors: "Micahel Butler" should be corrected to
--Michael Butler--.

Signed and Sealed this

Thirtieth Day of June, 2009

JOHN DOLL
*Acting Director of the United States Patent and Trademark Office*